(12) United States Patent
Leung

(10) Patent No.: US 8,489,843 B2
(45) Date of Patent: Jul. 16, 2013

(54) CONFIGURABLE MEMORY DEVICE

(75) Inventor: Wingyu Leung, Cupertino, CA (US)

(73) Assignee: Chip Memory Technology, Inc., San Jose, CA (US)

( * ) Notice: Subject to any disclaimer, the term of this patent is extended or adjusted under 35 U.S.C. 154(b) by 420 days.

(21) Appl. No.: 12/763,240

(22) Filed: Apr. 20, 2010

(65) Prior Publication Data

US 2011/0258364 A1 Oct. 20, 2011

(51) Int. Cl.
*G06F 12/00* (2006.01)
(52) U.S. Cl.
USPC .... 711/170; 711/173; 711/202; 711/E12.008; 711/E12.059; 711/E12.001
(58) Field of Classification Search
USPC .......... 711/170, 103, 165, 202, 206, E12.001, 711/E12.008, E12.059
See application file for complete search history.

(56) References Cited

U.S. PATENT DOCUMENTS

| 6,581,130 | B1 * | 6/2003 | Brinkmann et al. ........... 711/202 |
| 7,447,069 | B1 * | 11/2008 | Harari et al. .............. 365/185.11 |
| 7,554,855 | B2 * | 6/2009 | Kim ........................ 365/189.16 |
| 2007/0174546 | A1 * | 7/2007 | Lee ................................. 711/113 |
| 2010/0011187 | A1 * | 1/2010 | Schoinas et al. .............. 711/206 |
| 2010/0293319 | A1 * | 11/2010 | Lim et al. ...................... 711/103 |
| 2011/0264859 | A1 * | 10/2011 | Yano et al. ..................... 711/118 |

* cited by examiner

*Primary Examiner* — Pierre-Michel Bataille
(74) *Attorney, Agent, or Firm* — Raj Abhyanker, P.C.

(57) ABSTRACT

A method includes forming a memory device through providing an array of non-volatile memory cells including one or more non-volatile memory cell(s) and an array of volatile memory cells including one or more volatile memory cell(s) on a substrate. The method also includes appropriately programming an address translation logic associated with the memory device through a set of registers associated therewith to enable configurable mapping of an address associated with a sector of the memory device to any memory address space location in a computing system associated with the memory device. The address translation logic is configured to enable translation of an external virtual address associated with the sector of the memory device to a physical address associated therewith.

23 Claims, 14 Drawing Sheets

CONFIGURABLE MEMORY DEVICE

FIELD OF TECHNOLOGY

This disclosure relates generally to monolithic semiconductor memory devices and, more particularly, to configurable mapping of an address space location associated with a memory device to any memory address space location in a computing system associated therewith.

BACKGROUND

A non-volatile memory, such as flash memory and Electrically Erasable Programmable Read-Only Memory (EEPROM), may be used to provide permanent data storage. The data state of non-volatile memory cells therein may be retained even when the power supply voltage is removed. In general, the non-volatile memory may have a smaller semiconductor (e.g., Silicon (Si)) footprint and a lower cost-per-bit than other semiconductor memories.

A volatile memory, such as Static Random Access Memory (SRAM) and Dynamic Random Access Memory (DRAM), may have a greater write speed but may not retain data when the power supply voltage is removed. The aforementioned characteristics of the non-volatile memory and the volatile memory may be utilized to store different types of data in a computing system. For example, the non-volatile memory may be used to store data that does not require frequent modification (e.g., program codes, account information, security keys). The volatile memory may be used to store temporary data, the fast access of which is critical to the performance of the computing system.

A memory circuit including both the volatile memory and the non-volatile memory may advantageously utilize the characteristics thereof. However, changes to the physical architecture of the memory circuit may be required to add one form of memory (e.g., non-volatile memory) in addition to the other form (e.g., volatile memory) already existing therein, which may result in increased complexity and/or costs associated therewith.

SUMMARY

Disclosed are a method, an apparatus and/or a system of configurable mapping of an address space location associated with a memory device to any memory address space location in a computing system associated therewith.

In one aspect, a method includes forming a memory device through providing an array of non-volatile memory cells including one or more non-volatile memory cell(s) and an array of volatile memory cells including one or more volatile memory cell(s) on a substrate. The method also includes appropriately programming an address translation logic associated with the memory device through a set of registers associated therewith to enable configurable mapping of an address associated with a sector of the memory device to any memory address space location in a computing system associated with the memory device. The address translation logic is configured to enable translation of an external virtual address associated with the sector of the memory device to a physical address associated therewith.

In another aspect, a configurable memory device includes a substrate, an array of non-volatile memory cells including one or more non-volatile memory cell(s) on the substrate, an array of volatile memory cells including one or more volatile memory cell(s) on the substrate, and an interface configured to enable coupling of the memory device to a memory controller associated therewith. The interface includes an address translation logic configured to be programmed through a set of registers associated therewith to enable configurable mapping of an address associated with a sector of the memory device to any memory address space location in a computing system associated with the memory device.

In yet another aspect, a computing system includes a memory device and a memory controller associated therewith. The memory device includes a substrate, an array of non-volatile memory cells including one or more non-volatile memory cell(s) on the substrate, an array of volatile memory cells including one or more volatile memory cell(s) on the substrate, and an interface configured to enable coupling of the memory device to a memory controller associated therewith. The interface includes an address translation logic configured to be programmed through a set of registers associated therewith to enable configurable mapping of an address associated with a sector of the memory device to any memory address space location in the computing system. The memory device is configured to be coupled to the memory controller through the interface thereof.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to configurably map an address space location associated with a memory device to any memory address space location in a computing system associated therewith. Although the present embodiments have been described with reference to specific example embodiments, it will be evident that various modifications and changes may be made to these embodiments without departing from the broader spirit and scope of the various embodiments.

Figure 1:
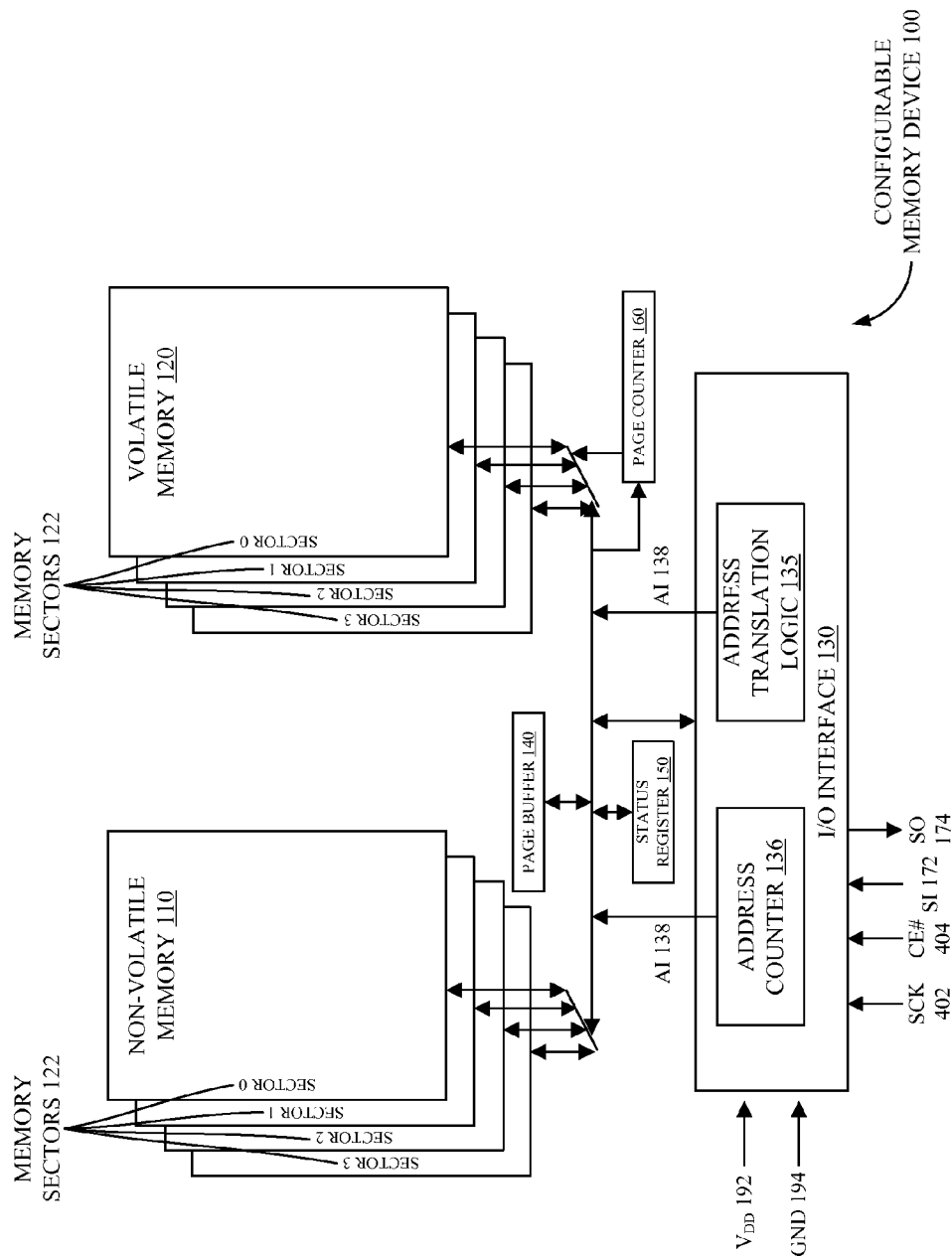
FIG. 1 is a schematic view of a configurable memory device, according to one or more embodiments.

FIG. 1 shows a configurable memory device 100, according to one or more embodiments. In one or more embodiments, configurable memory device 100 may include a non-volatile memory 110 and a volatile memory 120. In one or more embodiments, non-volatile memory 110 may be an array of non-volatile memory cells and volatile memory 120 may be an array of volatile memory cells. In one or more embodiments, non-volatile memory 110 and volatile memory 120 may be provided on a same substrate (e.g., a Silicon (Si) wafer) to form configurable memory device 100. Thus, in one or more embodiments, configurable memory device 100 may be monolithic, i.e., configurable memory device 100 may include components therein that are formed on a single substrate. In one or more embodiments, the array of non-volatile memory cells may be an array of flash memory cells or an array of Read-Only Memory (ROM) cells, and the array of volatile memory cells may be an array of Random Access Memory (RAM) cells. Examples of RAM include Dynamic RAM (DRAM) and Static RAM (SRAM).

For the sake of convenience in discussion, an assumption that each of non-volatile memory 110 and volatile memory 120 includes 1 Megabits (1 Mb) therein may be made. In accordance with the aforementioned assumption, each of non-volatile memory 110 and volatile memory 120 may be divided into 4 sectors. A 256 byte page buffer 140 may be provided to facilitate writing to non-volatile memory 110, and a 128 bit page counter 160 may be incorporated therein to generate a memory page address during a transfer operation to be discussed in detail below. An 8-bit status register 150 may be provided with each bit therein being associated with a memory sector (0-3) 122 of a non-volatile memory 110 or a volatile memory 120. For example, bits 4-7 may be associated with a memory sector (0-3) 122 of volatile memory 120 and bits 0-3 may be associated with a memory sector (0-3) 122 of non-volatile memory 110. In one or more embodiments, a busy state (e.g., busy with a memory operation) of the associated memory sector (0-3) 122 may be indicated through a bit in status register 150 being set high (or low, depending on the implementation).

Memory sectors (0-3) 122 may be associated with an Input/Output (I/O) interface 130 configured to couple configurable memory device 100 to an external device. In one or more embodiments, I/O interface 130 may utilize a Serial Periphery Interface (SPI) bus for the aforementioned coupling purpose. I/O interface 130 may include an address counter 136 configured to generate a byte address within a memory page at an output thereof, i.e., Address Input (AI) 138, during a read or write access. I/O interface 130 may also include address translation logic 135 configured to enable translation of an external virtual address (e.g., external logical sector address) associated with memory sector (0-3) 122 to a physical address associated therewith, thereby enabling access to a selected memory sector (0-3) 122. In FIG. 1, AI 138, also shown as the output of address translation logic 135, may be a physical sector address.

Further, I/O interface 130 may include a serializer (not shown) and a de-serializer (not shown) configured to enable conversion of a serial information received from the Serial Data In (SI) 172 line to a parallel form thereof and a parallel read data to a serial form thereof for transmission on the Serial Data Out (SO) 174 line. An instruction decoder (not shown) may also be incorporated in I/O interface 130 for decoding memory transactions received from a memory controller (not shown) associated with configurable memory device 100. The memory controller may be coupled to configurable memory device 100 through I/O interface 130. FIG. 1 demonstrates the use of a serial bus (e.g., SPI bus) to interface with the external world. It is obvious to that configurable memory device 100 may interface with the external world through a parallel bus. Also, the 1 Mb of non-volatile memory 110 and volatile memory 120 and other numerals therein serve merely as examples. Modifications in the aforementioned numerals and interfaces are well within the scope of the exemplary embodiments. In FIG. 1, VDD 192 may be the supply voltage, and GND 194 may be the ground.

Figure 2:
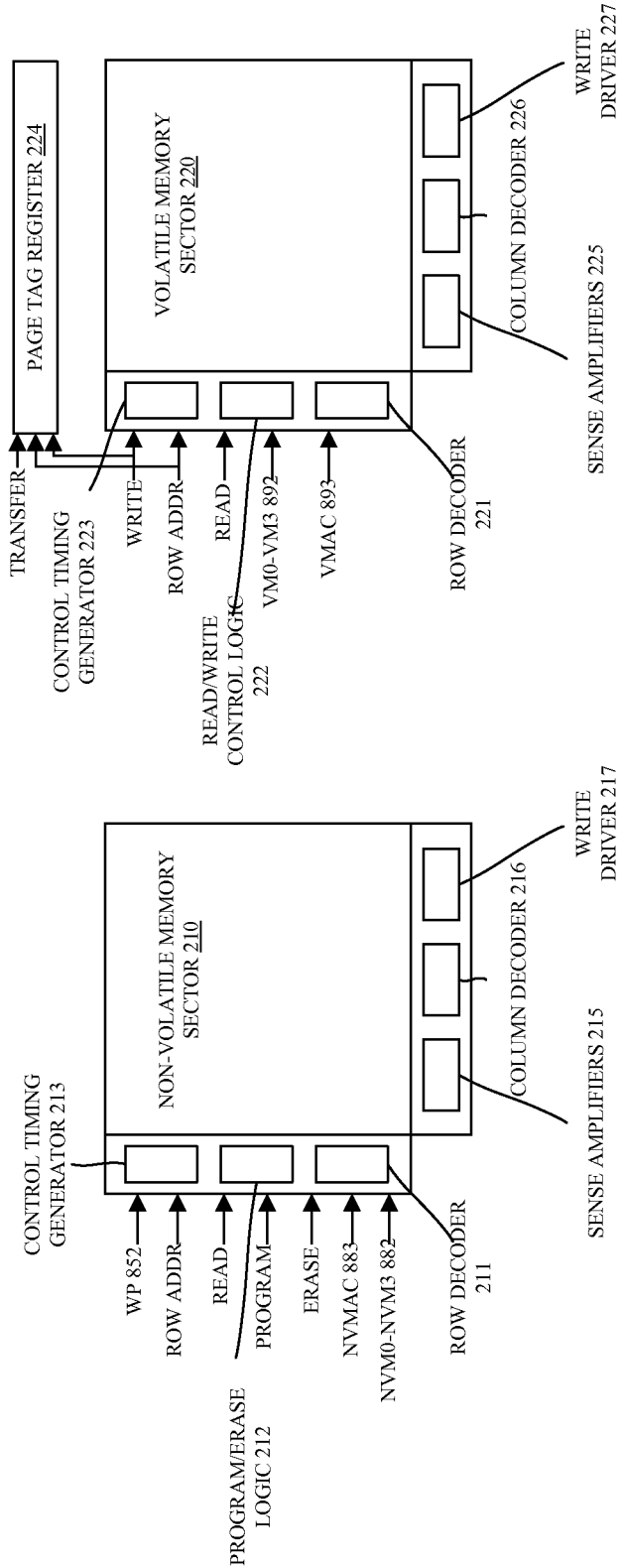
FIG. 2 is a schematic view of a non-volatile memory sector and a memory sector, according to one or more embodiments.

FIG. 2 shows a non-volatile memory sector 210 and a volatile memory sector 220, according to one or more embodiments. Here, non-volatile memory sector 210 and volatile memory sector 220 are analogous to memory sector (0-3) 122 of FIG. 1. In accordance with the example numerals mentioned above, non-volatile memory sector 210 may include a 256 kilobyte (KB) array of non-volatile memory cells arranged in rows and columns therein, a row logic including a row decoder 211, a program/erase logic 212, and a control timing generator 213, and a column logic including sense amplifiers 215, a column decoder 216 and a write driver 217. Likewise, volatile memory sector 220 may include a 256 KB array of volatile memory cells arranged in rows and columns therein, a row logic including a row decoder 221, a read/write control logic 222, and a control timing generator 223, and a column logic including sense amplifiers 225, a column decoder 226 and a write driver 227.

Implementations of non-volatile memory sector 210 and volatile memory sector 220 are well known to one skilled in the art. Therefore, detailed discussion associated therewith may be skipped for the sake of convenience. Volatile memory sector 220 may also be associated with a 128 bit page tag register 224 that includes bits associated with memory pages of volatile memory sector 220. In one or more embodiments, setting of a tag bit indicates that the corresponding memory page has been modified following a previous transfer operation performed on the aforementioned memory page. The transfer operation will be discussed in detail below. In FIG. 2, ROW ADDR signifies Row Address.

Figure 3:
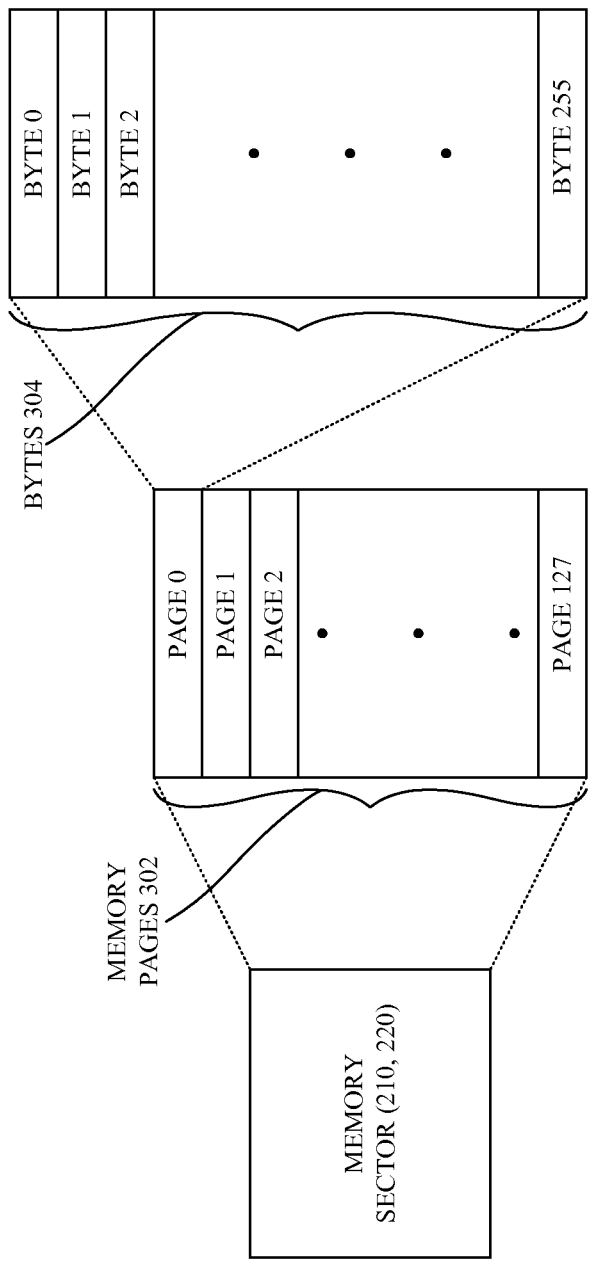
FIG. 3 is a schematic view of organization of the non-volatile memory sector and the memory sector of FIG. 2, according to one or more embodiments.
Figure 4:
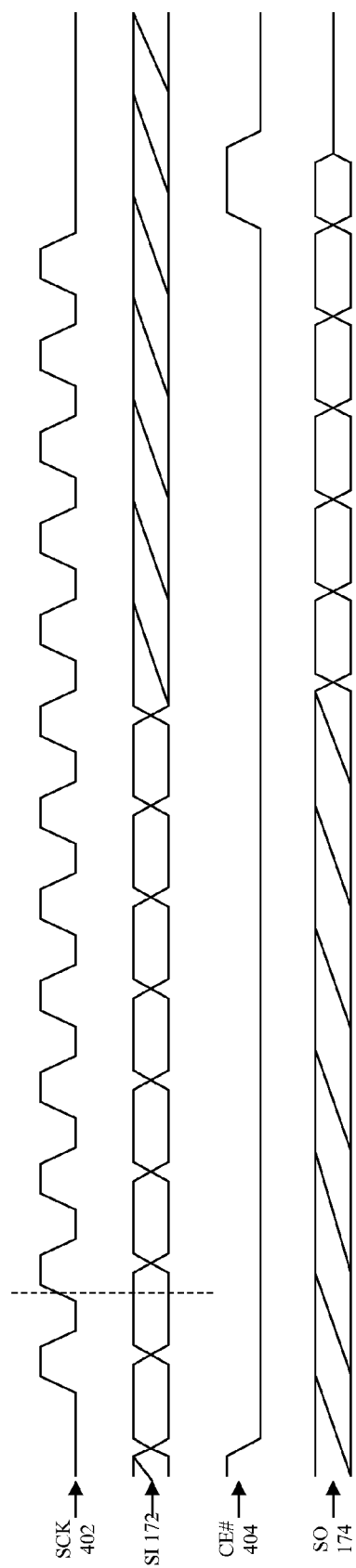
FIG. 4 is a timing diagram associated with an Input/Output (I/O) interface of the configurable memory device of FIG. 1, according to one or more embodiments.

FIG. 3 shows organization of non-volatile memory sector 210 and volatile memory sector 220, according to one or more embodiments. As shown in FIG. 3, each memory sector (210, 220) may be divided into 128 memory pages 302, where each memory page 302 includes 256 bytes 304 of memory. In one or more embodiments, each memory sector (210, 220) may include sub-sectors (not shown), each of which may include memory pages. FIG. 4 shows timing information associated with I/O interface 130, according to one or more embodiments. Here, I/O interface 130 employs an SPI bus in a mode 0 compliant operation. The SPI standard is well documented in public literature and known to one skilled in the art. It may be assumed that configurable memory device 100 is coupled to a memory controller (not shown) through the SPI bus.

During bus idling, serial clock (SCK) 402 signal may be kept low (or high, depending on the implementation) and Chip Enable (CE#) 404 signal may deactivated high (or low, depending on the implementation). At the beginning of a communication, CE#404 may be driven low (or high, depending on the implementation) by the memory controller, and the first bit of the operation code may be driven on SI 172 signal. Subsequently, SCK 402 may start toggling. The rising edge or the falling edge of SCK 402 may be used by configurable memory device 100 to latch an operation code associated with a type of access to configurable memory device 100, address and/or data bits. FIG. 4 shows the rising edge of SCK 402 being used to latch the operation code, address and/or data bits. The corresponding falling edge or the rising edge of SCK 402 may be used by configurable memory device 100 to strobe the output data bit on the signal. The most frequently performed operations include read and write memory accesses.

Figure 5:
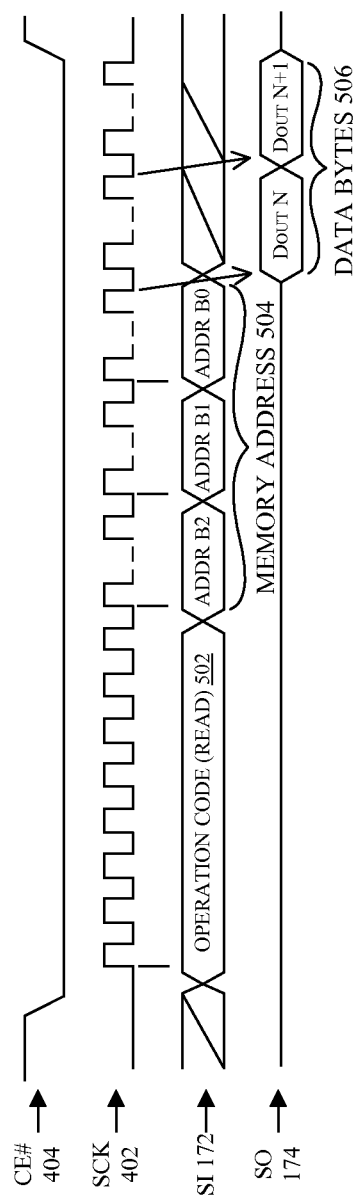
FIG. 5 is a timing diagram associated with a read access utilizing the configurable memory device of FIG. 1, according to one or more embodiments.

FIG. 5 shows a timing sequence associated with a read access on the SPI bus, according to one or more embodiments. In one or more embodiments, the first byte of information transferred on SI 172 signal may be the operation code (read) 502, which is followed by bytes (e.g., 3 bytes) of memory address 504 (e.g., Addr B2, Addr B1, Addr B0) specifying the location of the first byte of data to be read. In the example embodiment shown in FIG. 5, the most significant bit may be transferred first during the transfer of both the operation code 502 and memory address 504. Following the receipt of the least significant bit of the address, configurable memory device 100 may drive the most significant bit of data bytes 506 in the addressed memory location on SO 174 signal at the subsequent falling edge of SCK 402. The first data byte 506 (e.g., $D_{out}$ N) may be followed by a second data byte 506 (e.g., $D_{out}$ N+1) in the next memory location.

Figure 6:
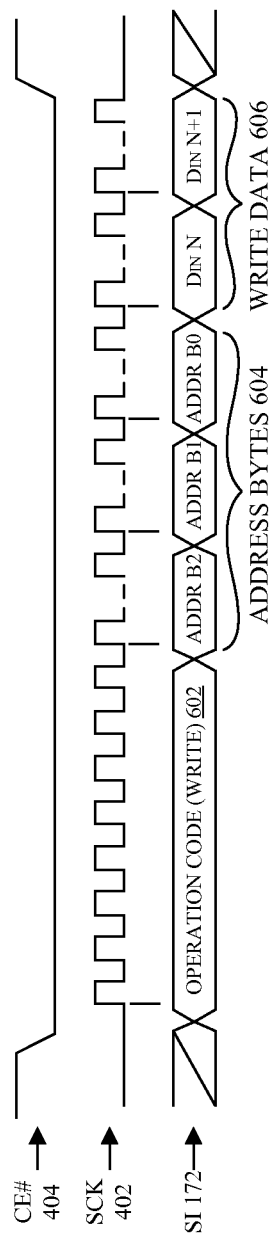
FIG. 6 is a timing diagram associated with a write transaction utilizing the configurable memory device of FIG. 1, according to one or more embodiments.

The data transfer may continue until SCK 402 is stopped or CE#404 is deactivated high (or low, depending on the implementation). The stopping of SCK 402 may cause the memory transaction to pause. The transaction may be resumed when SCK 402 starts toggling again. The deactivation of CE#404 may abort the transaction. FIG. 6 shows the timing sequence of a write transaction, according to one or more embodiments. In one or more embodiments, the first byte of information transferred from the memory controller to configurable memory device 100 on SI 172 signal may be the operation code (write) 602. The most significant bit may be transferred first. Operation code (write) 602 may be followed by address bytes 604 (e.g., Addr B2, Addr B1, Addr B0) that specify the starting memory location to which write data 606 is written to. Write data 606 (e.g., $D_{in}$ N, $D_{in}$ N+1) may be transferred after address bytes 604. The first byte (e.g., $D_{in}$ N) to be stored in the specified address (N) may be transferred first, followed by the second byte (e.g., $D_{in}$ N+1) to be stored in the next address location (N+1). The transfer of write data 606 may continue until SCK 402 is stopped or CE#404 is deactivated high (or low, depending on the implementation). Again, the stopping of SCK 402 may cause the information transfer to pause. The transfer may, again, be resumed when SCK 402 starts to toggle again. The deactivation of CE#404 may, again, abort the transaction.

Figure 7:
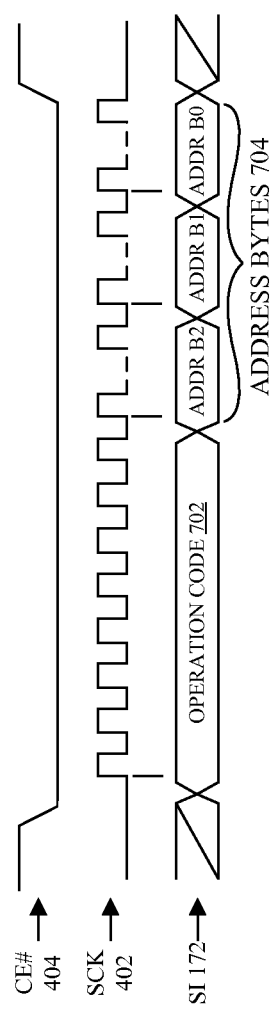
FIG. 7 is a timing diagram associated with an operation not requiring data transfer, according to one or more embodiments.

The read and write operations discussed with regard to FIGS. 5-6 may be performed on volatile memory 120, non-volatile memory 110, hybrid memory (not shown but to be discussed below) and/or registers (e.g., status register 150, control registers (not shown), address map registers (to be discussed below)) associated therewith. Both the read and write operations may involve data transfer, as shown in FIGS. 5-6. Operations that do not involve data transfer may include program and erase operations (to be discussed below). In these transactions, only the operation code and the address location are transmitted from the memory controller to configurable memory device 100. FIG. 7 shows the timing sequence of an operation not requiring data transfer, according to one or more embodiments. The transfer may begin with operation code 702 (e.g., 1 byte of operation code), followed by address bytes 704 (e.g., Addr B2, Addr B1, Addr B0). Again, the most significant bit of operation code 702 and address bytes 704 may be transferred first.

Figure 8:
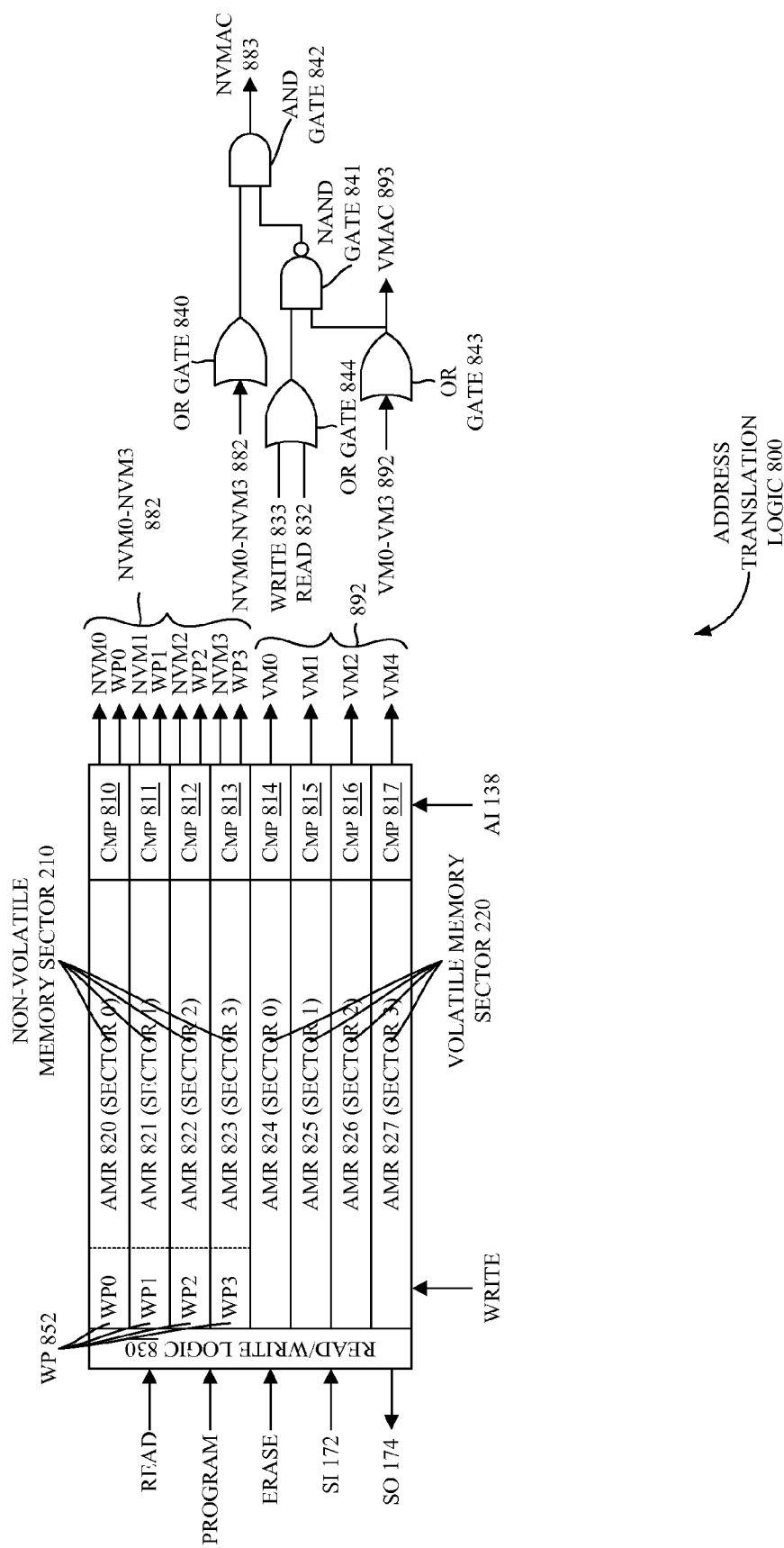
FIG. 8 is a schematic view of address translation logic associated with the configurable memory device of FIG. 1, according to one or more embodiments.

FIG. 8 shows address translation logic 800 associated with configurable memory device 100, according to one or more embodiments. Here, address translation logic 800 is analogous to address translation logic 135 of FIG. 1. Address translation logic 135 may be configured to enable translation of an external virtual address (e.g., external logical sector address) associated with memory sector (0-3) 122 (or memory sector (210, 220)) to a physical address associated therewith. In one or more embodiments, the virtual address may be programmable through a set of registers. In one or more embodiments, address translation logic 800 may include address map registers 820-827 (shown as AMR 820-827), address comparators (CMP) 810-817 and read/write logic 830.

In an example embodiment, the register bits may be implemented with flash memory cells. Each register may be associated with a memory sector (0-3) 122 (or memory sector (210, 220)). In an example shown in FIG. 8, address map registers 820-823 may be associated with memory sectors (0-3) 122 of non-volatile memory 110, and address map registers 824-827 may be associated with memory sectors (0-3) 122 of volatile memory 120. Each address map register 820-827 may include an address field (e.g., 4 bit address field). The bit address field may include the address of the associated memory sector. In one or more embodiments, address map registers 820-823 associated with a non-volatile memory sector 210 may include a write protection (WP) 852 bit (e.g., WP0-WP3).

When WP 852 bit of a non-volatile memory sector 210 is set, any transaction (e.g., a program, an erase, a write transaction) that attempts to modify a memory location in non-volatile memory sector 210 may be ignored. As discussed above, each address map register 820-827 may include CMP 810-817 associated therewith configured to compare the memory access address of each memory transaction with bits of information stored in the bit address field. In one or more embodiments, when the bits in the address field match the corresponding bits in the address bus AI 138, the output of CMP 810-817 may be driven high (or low, depending on the implementation) to indicate that the requisite memory access is to be served by the associated memory sector (0-3) 122. As shown in FIG. 8, CMP 810-813 associated with non-volatile memory 110 may drive output signals NVM0-NVM3 882 associated therewith, and CMP 814-817 associated with volatile memory 120 may drive output signals VM0-VM3 892 associated therewith. NVM0-NVM3 882, VM0-VM3 892, and WP0-WP3 852 may be driven to the corresponding memory sector to facilitate memory access therein.

As shown in FIG. 8, VM0-VM3 892 may be coupled to OR gate 843 as an input thereof to generate a volatile memory access (VMAC) 893 signal. Similarly, NVM0-NVM3 882 may be input to OR gate 840. The output of OR gate 840 may be configured to be input to AND gate 842 to generate the non-volatile memory access (NVMAC) 883 signal. VMAC 893 signal and NVMAC 883 signal, when activated high (or low, depending on implementation), enable access to volatile memory 120 and non-volatile memory 110 respectively. The functionality of logic gates 840-844 will become apparent during discussion associated with memory access operations.

Through programming the address field of an address map register 820-827 associated with a memory sector (0-3) 122, mapping of the sector address to any memory address space location in a computing system associated with configurable memory device 100 may be made possible. In one or more embodiments, this may enable application programs to map different sectors of non-volatile memory 110 and/or volatile memory 120 to different locations in the system address space, thereby meeting application requirements in a flexible manner. In one or more embodiments, through programming of a non-volatile memory sector 210 and a volatile memory sector 220 to have the same sector address, a sector of a hybrid memory 930 may be formed. The creation of a third kind of memory on configurable memory device 100 may provide increased memory versatility to an application associated with the computing system.

Figure 9:
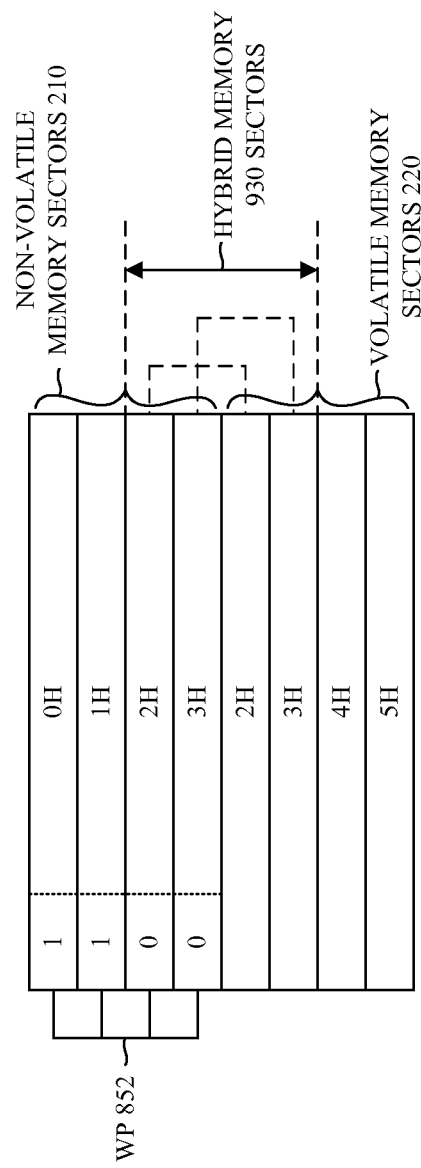
FIG. 9 is an illustrative view of configuring the configurable memory device of FIG. 1 into separate memory types, according to one or more embodiments.

FIG. 9 shows configuring memory device 100 into separate memory types, according to one or more embodiments. In the exemplary configuration shown in FIG. 9, non-volatile memory 110, volatile memory 120 and hybrid memory 930 may occupy different memory spaces therein. For example, a 64 KB of non-volatile memory 110 may occupy the address space associated with the first two sectors therein; a 64 KB of hybrid memory 930 may occupy the address space associated with the third and fourth sectors therein; and a 64 KB of volatile memory 120 may occupy the address space associated with the fifth and sixth sectors therein. As shown in FIG. 9, sector 2 of non-volatile memory 110 and sector 0 of volatile memory 120 have the same address (e.g., 2H in hexadecimal notation). Also, sector 3 of non-volatile memory 110 and sector 1 of volatile memory 120 have the same address (e.g., 3H in hexadecimal notation). These four sectors may combine to form the third and fourth sectors of hybrid memory 930 in configurable memory device 100. Thus, configurable memory device 100 may have the fifth and sixth sectors therein as volatile memory 110, as per FIG. 9.

It is obvious that the abovementioned configuring of configurable memory device 100 is merely an example. Other possible modifications to have differing amounts of non-volatile memory 110, volatile memory 120 and/or hybrid memory 930 are well within the scope of the exemplary embodiments. Also, non-volatile memory 110 space may be write protected. As shown in FIG. 9, write protection bit (e.g., WP 852 bit) associated with the first and second sector may be set to a high (e.g., "1") state (or a low state, depending on the implementation).

Accordingly, in one or more embodiments, configurable memory device 100 may support operations associated with accesses to the three different kinds of memory. The read operation may be universal to all three types of memories. The write operation may be used to stored data in volatile memory 120 and the volatile portion of hybrid memory 930. The write operation, again, may be associated with all three types of memories. The transfer operation may be associated with transferring data from the volatile portion of hybrid memory 930 to the non-volatile portion therein. Likewise, the recall operation may be configured to facilitate transfer of data from the non-volatile portion of hybrid memory 930 to the volatile portion therein. The erase instruction may include an Erase Page (ERASEPG) instruction, an Erase Sector (ERASEST) or an Erase Memory (ERASECP) instruction. ERASECP may be configured to erase all content associated with non-volatile memory 110 or the non-volatile portion of hybrid memory 930. ERASEST may be configured to erase all content associated with a memory sector of non-volatile memory 110 or the non-volatile portion of hybrid memory 930. ERASEPG may be configured to erase all content associated with a memory page of a memory sector of non-volatile memory 110 or the non-volatile portion of hybrid memory 930.

Status register 150 may be read using the READ Status Register (READSRG) instruction. Address map registers 820-827 may be read or written to using the READ translation address register (READTA) and WRITE translation address register (WRITETA) instructions respectively. The aforementioned instructions may include an operation code (e.g., 1 byte) and address bytes (e.g., 3 bytes). The memory controller may transmit the operation code through the SI 172 line to initiate the memory transaction, followed by the address bytes. In case of a write transaction, write data 606 may be transferred on SI 172 line following address bytes 604. In case of a read operation, read data 506 may be sent through SO 174 line after memory address 504 is received.

In one or more embodiments, in order to read a memory location in configurable memory device 100, an operation code 502 followed by memory address 504 may be transferred from the memory controller to configurable memory device 100, as shown in FIG. 5. Memory address 504 may include a sector address, a page address and a byte address therein. The sector address, AI 138, may be input to address translation logic 135, where a comparison of AI 138 may be done with the address field of an address map registers 820-827. A match with the address field of an address map register 820-827 may cause the output of the associated comparator CMP 810-817 to go high (or low, depending on the implementation). For example, if the sector address stored in address map register 822 matches the input sector address AI 138, CMP 812 may drive NVM2 882 high (or low, depending on the implementation).

It is to be noted that it may be possible to have multiple address matches, which may result in multiple comparator outputs (CMP 872) being driven high (or low, depending on the implementation). This may be the case when a non-volatile memory sector 210 may be combined with a volatile memory sector 220 to form a sector of hybrid memory 930. Here, non-volatile memory 110 and volatile memory 120 may share a same sector address. Any access to the hybrid memory 930 sector may cause the comparators (CMP 810-817) associated with volatile memory sector 220 and non-volatile memory sector 210 to drive the output thereof high (or low, depending on the implementation). In the case when two volatile memory sectors 220 or two non-volatile memory sectors 210 have matches therein, configurable memory device 100 may be configured wrong and the read access may be aborted.

When a volatile memory sector 220 (e.g., sector (3) 122) address matches AI 138, VM0-VM3 892 (e.g., VM3 892) may be driven high (or low, depending on the implementation). VMAC 893 signal may also be driven high (or low, depending on the implementation) through OR gate 843, thereby enabling memory access to volatile memory sector 220. The lower bits of AI 138 may be loaded into address counter 136, the output of which may be routed to all memory sectors (210, 220) to enable selection of the byte location for the read operation. In this case, data in the selected byte location in volatile memory sector 220 may driven to I/O interface 130 and subsequently gated out to SO 174 line. Assuming the addressed byte location is K, data in location K+1 may be transmitted through SO 174 line, following the transmission of the data byte in location K and the corresponding increment in address counter 136. Following this, address counter 136 may be incremented to K+2. Data from subsequent locations continue to be transmitted. The read process may continue until either the abortion thereof through the memory controller or the deactivation high of CE#404, as discussed above.

When the input sector address in AI 138 matches a non-volatile memory sector 210 (e.g., sector (0) 122) address, NVM0-NVM3 882 (e.g., NVM0 882) may be driven high (or low, depending on the implementation). As the operation is a Read, Read 832 signal may be activated high (or low, depending on the implementation). Read 832 signal may be input to OR gate 844, the output of which is input to NAND gate 841. The output of NAND gate 841 may serve as an input to AND gate 842. VMAC 893 signal may be driven low because there is no volatile memory sector 220 address matching AI 138. NVMAC 883 signal may be driven high through AND gate 842, thereby enabling non-volatile memory sector 210 (e.g., sector (0) 122) for the read access. The rest of the read operation is similar to that of the read operation associated with volatile memory sector 220 described above.

Reading from a sector of hybrid memory 930 may cause outputs of two comparators (CMP 810-817) in address translation logic 800 (135) to go high (or low, depending on the implementation): one from a non-volatile memory sector 210 and one from a volatile memory sector 220. As a result, VMAC 893 signal may be driven high (or low, depending on the implementation) through OR gate 843. Read 832 signal may also be obviously activated high (or low, depending on the implementation). The output of NAND gate 841 may be driven low (or high, depending on the implementation), thereby causing AND gate 842 to drive NVMAC 893 signal low (or high, depending on the implementation). This may disable access to non-volatile memory 110. The high (or low, depending on the implementation) state of VMAC 893 signal and the high (or low, depending on the implementation) state of VM0-VM3 892 may enable access to volatile memory sector 220 selected through AI 138 for the read operation. The rest of the read operation is identical to that of the read operation associated with volatile memory sector 220.

In one or more embodiment, an erase operation may only be carried out on non-volatile memory 110 or the non-volatile portion of hybrid memory 930. The erase operation may prepare non-volatile memory 110 for subsequent writing thereto or for programming with new data. In the case of hybrid memory 930, an erase operation may prepare the non-volatile portion therein for a transfer operation that involves copying data from the volatile portion therein to the non-volatile portion. After an erase operation is performed, the erased memory locations may lose previously stored data therein. In the case of write protected memory sectors, i.e., sectors with WP 852 bits thereof set to 1 (or 0, depending on the implementation), the erase operation may be ignored. An erase transaction may not be recognized by configurable memory device 100 unless all the bits in status register 150 are 0 (or 1, depending on the implementation). In one or more embodiments, as described above, three erase instructions may be supported, viz. erase memory (ERASECP), erase sector (ERASEST), and erase page (ERASEPG). An erase operation may begin after the receipt of operation code and address bytes associated therewith from the memory controller through SI 172 line. When the operation code received is associated with ERASECP, the address bytes may be ignored. An erase transaction may not involve data transfer, and may be an example case of the transaction discussed with respect to FIG. 7.

All non-volatile memory sectors 210 having associated WP 852 bits reset to 0 (or 1, depending on the implementation) may participate in the ERASEPG operation. The bits in status register 150 associated with the participating sectors are set to 1 (or 0, depending on the implementation), indicating that these memory sectors are busy. The erase operation carried out herein is well known to one skilled in the art, and discussion associated therewith may be skipped for the sake of convenience. In one example embodiment, the erase operation may take about 10-50 milliseconds (ms) to complete. When the erase operation is completed, the bits in status register 150 may be reset to 0 (or 1, depending on the implementation).

Figure 10:
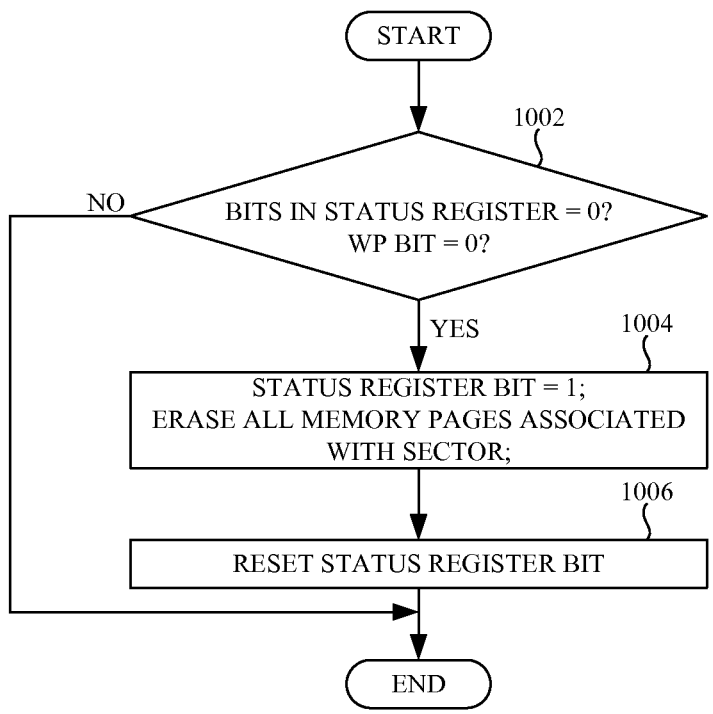
FIG. 10 is a flowchart detailing the operations involved in an erase sector (ERASEST) operation, according to one or more embodiments.

When the operation code received is associated with ERASEST, the sector address may be driven onto AI 138 bus. Referring to FIG. 8, the sector address in AI 138 may be matched with the address field of address map registers 820-827. If one of NVM0-NVM3 882 is driven, then NVMAC 883 signal may be driven high (or low, depending on the implementation). FIG. 10 shows a flowchart detailing the operations involved in an erase sector (ERASEST) operation, according to one or more embodiments. The erase operation is performed only when all the bits in status register 150 are 0 (or 1, depending on the implementation) and WP 852 bit associated with the selected sector is 0 (or 1, depending on the implementation). This may indicate that configurable memory device 100 is not busy with a memory access operation and that the selected sector is not write protected. If the bits in status register 150 are not 0 (or 1, depending on the implementation) or WP 852 bit associated with the selected sector is not 0 (or 1, depending on the implementation), the erase operation may be terminated with no effect on the data stored in configurable memory device 100.

Thus, operation 1002 may involve checking as to whether bits in status register 150 and WP 852 bit are 0. If no, then the erase operation may be terminated, as shown in FIG. 10. If yes, operation 1004 may involve setting the status register 150 bit, i.e., status register 150 bit=1, to indicate that the sector associated therewith is busy. Operation 1004 may also involve simultaneously erasing all memory pages associated with the sector. Again, in one example embodiment, the erase operation may take about 10-50 ms to complete. Following the completion of the erase operation, the status register 150 bit associated with the sector may be reset to 0 in operation 1006 to indicate that the sector is ready for another operation.

When the operation code received is associated with ERASEPG, the sector address may be driven onto the AI 138 bus, and the page address associated therewith may be routed and decoded in the memory sector to select a memory page to erase. Referring to FIG. 8, the sector address in AI 138 may be matched with the address field of address map registers 820-827. If one of NVM0-NVM3 882 is driven, then NVMAC 883 signal may be driven high (or low, depending on the implementation). As discussed in FIG. 10 with regard to ERASEST, a whole memory page (e.g., 256 bytes) addressed by AI 138 in the sector may be erased simultaneously. In one example embodiment, the erase operation, again, may take about 10-50 ms to complete. After the completion of the erase operation, the status register 150 bit associated with the sector may be reset to 0 (or 1, depending on the implementation) to indicate that the sector is ready for another operation.

In one or more embodiments, a write transaction may begin with the memory controller transferring operation code 602 followed by address bytes 604 to configurable memory device 100 through SI 172 line. Discussion with regard to timing associated therewith is similar to the discussion associated with FIG. 6. The address translation of a write operation is the same as that in a read operation, as discussed above. For the write operation, requisite memory sector access may be enabled through a match between the address field of the associated address map register 820-827 and the sector address in AI 138.

With regard to accessing a volatile memory sector 220, the address advancement associated therewith may be the same as the read operation, with the least significant bits of the address to be accessed being loaded into address counter 136, and then output to AI 138 to specify the first write data 606 byte location. Address counter 136 may then be incremented to the next location for the next write data 606 byte. The process may continue until a maximum count is reached. After that, the output value of address counter 136 may wrap around to an initial value. Then address counter 136 may continue to increment and then wrap around to the initial value after the maximum count is reached. When the address is repeated, data in volatile memory 120 may be overwritten. The write process may be terminated when CE#404 is driven high (or low, depending on the implementation). At the end of the write operation, the register bits associated with the memory pages that received write data 606 during the operation are set to 1 (or 0, depending on the implementation).

Referring to FIG. 8, when the write operation is addressed to a hybrid memory 930 sector, one of NVM0-NVM3 882 and one of VM0-VM3 892 may be driven high (or low, depending on the implementation) respectively through OR gate 843 and OR gate 840. The high state (or low state, depending on the implementation) of VM0-VM3 892 may enable access to volatile memory sector 220 whose sector address in address map register 820-827 matches the value in AI 138. However, NVMAC 883 signal may be driven low through AND gate 842 because the high state of Write 833 signal (input to OR gate 844) causes output of OR gate 844 to go high (or low, depending on the implementation), which, together with the high (or low, depending on the implementation) state of VMAC 893 signal, causes the output of NAND gate 841 to go low (or high, depending on the implementation). The low state of NVMAC 883 signal may block any operation to non-volatile memory 110. The rest of the write operation is similar to the write operation associated with volatile memory 120.

A write access to a non-volatile memory sector 210 may result in the programming of a memory page in non-volatile memory sector 210 with the input data. A memory page associated with non-volatile memory 110 may need to be erased prior to being written to, failing which data written to non-volatile memory 110 may not be correct. Following the sector address matching, all VM0-VM3 892 may stay low (or high, depending on the implementation), and one of NVM0-NVM3 882 may go high (or low, depending on the implementation). As a result, VMAC 893 signal may stay low (or high, depending on the implementation), but output of OR gate 840 and NAND gate 841 may go high (or low, depending on the implementation). This, in turn, may cause AND gate 842 to drive NVMAC 883 signal high (or low, depending on the implementation). If WP 852 bit of the selected non-volatile memory sector 210 is 1 (or 0, depending on the implementation), then the write transaction may be aborted, with the input write data 606 being ignored. If WP 852 bit is 0 (or 1, depending on the implementation), then access to non-volatile memory sector 210 having a logical address matching the value at AI 138 may be setup for the write operation.

The least significant bits of the address to be accessed may be loaded into address counter 136. Write data 606 may then be loaded into page buffer 140, with the byte location being pointed to through AI 138. Address counter 136 may be incremented after loading of each byte of write data 606 into page buffer 140. The increment may continue until AI 138 reaches a maximum value, following which the count at AI 138 may wrap around to an initial value. The rest of the output bits on AI 138 may remain unchanged. The writing may continue until CE#404 is driven high (or low, depending on the implementation), following which the write transaction is terminated.

At that time, data may be transferred from page buffer 140 to the memory page and block associated with the selected non-volatile memory sector 210 addressed by the value of AI 138. The transfer may be accomplished through simultaneous programming of all non-volatile memory cells in the selected memory page with the data in page buffer 140. In one example embodiment, the programming may require 10-20 microseconds (µs) to complete. During the programming period, the status register 150 bit associated with the selected non-volatile memory sector 210 may be set to 1 (or 0, depending on the implementation) to indicate that non-volatile memory sector 210 is busy. Any access to a busy memory sector may be ignored. The state of status register 150 may be monitored through the memory controller by executing a READSRG instruction. At the end of the programming operation, the associated status register 150 bit is reset to 0 (or 1, depending on the implementation) to indicate that the memory sector is ready for another transaction.

In one or more embodiments, a transfer operation may copy data from a volatile portion of hybrid memory 930 to a non-volatile portion therein. In one or more embodiments, an erase operation may be performed on a memory sector prior to a transfer operation therein. In one or more embodiments, the transfer operation may be carried out internally one memory page at a time. Only memory pages in the volatile portion of hybrid memory 930 that have been modified (e.g., written to) following a previous transfer operation therewith may participate in the data transfer. A transfer transaction may be ignored unless all the bits in status register 150 are 0 (or 1, depending on the implementation), thereby indicating that no memory sector is busy with an operation. A transfer transaction may begin following the receipt of a transfer operation code and address bytes from the memory controller through SI 172 line.

Figure 11:
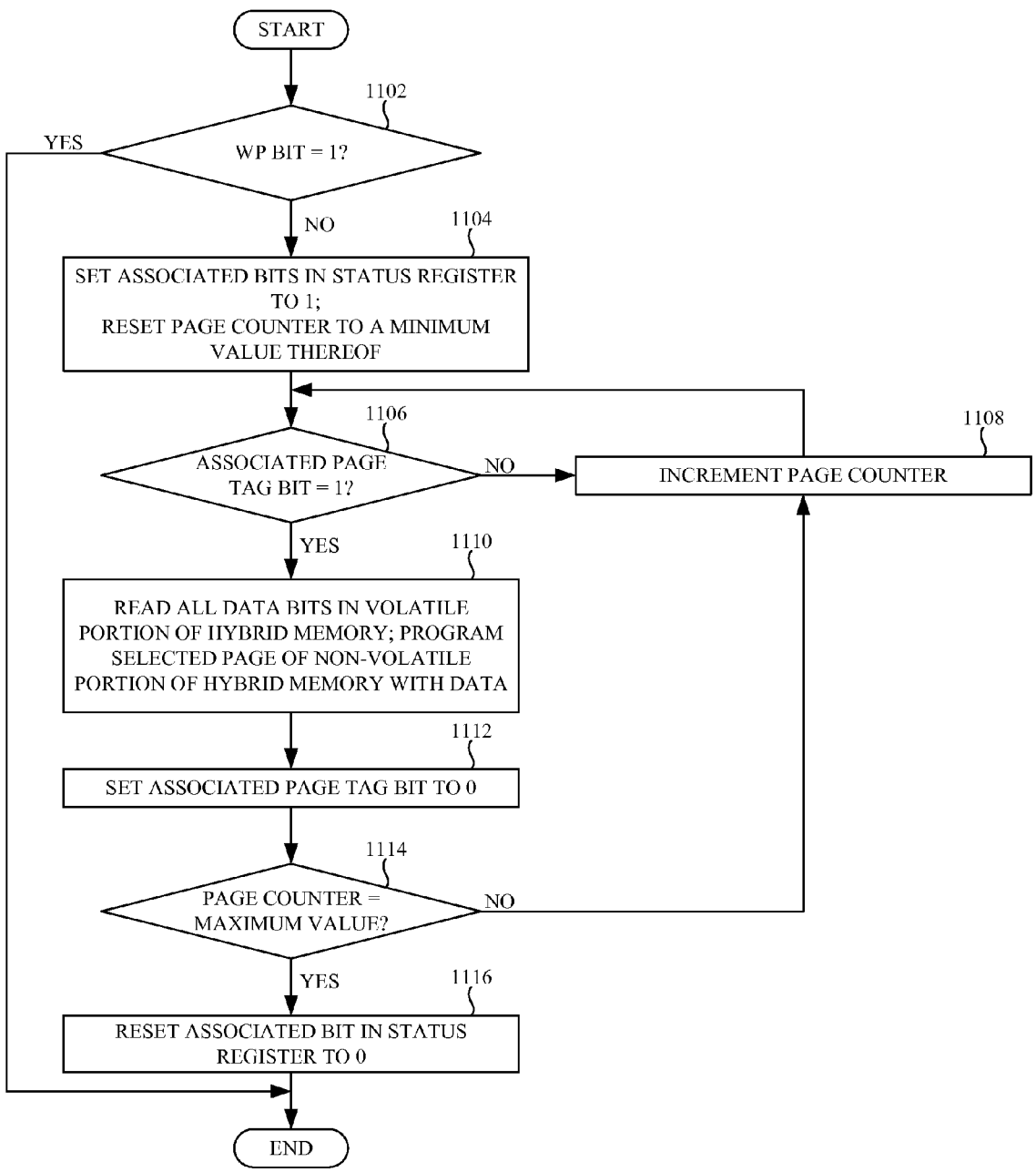
FIG. 11 is a flowchart detailing the operations involved in a transfer transaction, according to one or more embodiments.

Unlike a read or write transaction that involves data transfer therewith, a transfer transaction may require only the operation code and address bytes. The discussion regarding timing associated with the transfer operation is analogous to the discussion associated with FIG. 7, and, therefore, may be skipped for the sake of convenience. Only the sector address may be relevant to a transfer transaction. FIG. 11 shows a flowchart detailing the operations involved in a transfer transaction, according to one or more embodiments. The sector address may be matched with the address field of address map registers 820-827. If one of NVM0-NVM3 882 and one of VM0-VM3 892 are driven high (or low, depending on the implementation) as a result of the address match, then both NVMAC 883 signal and VMAC 893 signal may be driven high (or low, depending on the implementation) to indicate a valid transfer operation. Otherwise, the transfer instruction may be deemed invalid, and, thereby, ignored. In one or more embodiments, a user of a computing system associated with configurable memory device 100 may need to make sure that no more than one volatile memory sector 220 and one non-volatile memory sector 210 have the same sector address in order to prevent wrong data from being copied to non-volatile memory 110.

After the validation of the transfer operation, WP 852 bit associated with the selected non-volatile memory sector 210 may be read. In one or more embodiments, operation 1102 may involve checking as to whether WP 852 is 1 (or 0, depending on the implementation). If WP 852 bit is 1 (or 0, depending on the implementation), then, as shown in FIG. 11, transfer operation may be aborted. Else, in operation 1104, the two bits in status register 150 associated with the selected non-volatile memory sector 210 and volatile memory sector 220 may be set to 1 (or 0, depending on the implementation) to indicate that the memory sector is busy. Also, in operation 1104, page counter 160 may be reset to a count equal to a minimum value thereof (e.g., 00H in hexadecimal) to enable setting up a first page (e.g., page 0) of the selected memory sectors for the transfer operation.

Operation 1106 may involve checking as to whether the associated tag bit in page tag register 224 is 1 (or 0, depending on the implementation), after the reading thereof. If the associated tag bit has a value 0 (or 1, depending on the implementation), the transfer process may not be performed on the aforementioned page. The 0 (or 1, depending on the implementation) value of the tag bit indicates that the page has not been modified following a previous transfer operation therein. Page counter 160 may then be incremented in operation 1108, as shown in FIG. 11. If the tag bit value is 1, all data bits in the volatile portion of hybrid memory 930 (i.e., a page of volatile memory 110 configured to be a part of hybrid memory 930) may be read and the selected page of the non-volatile portion of hybrid memory 930 (i.e., the page of non-volatile memory 120 configured to be part of hybrid memory 930) may be programmed with data in operation 1110. Following the completion of programming therein, the associated page tag bit may be set to 0 (or 1, depending on the implementation) in operation 1112.

In operation 1114, a check may be performed as to whether page counter 160 has reached a maximum value (i.e., the end of address allotment) thereof. If no, page counter 160 may be incremented, as in operation 1108, and operation 1106 may be performed on the next page (e.g., second page). The process may repeat sequentially for all memory pages (e.g., 128 pages). Then the transfer operation may terminated (e.g., if the check in operation 1114 yields that page counter 160 has reached the maximum value), and the associated bit in status register 150 may be reset to 0 (or 1, depending on the implementation) in operation 1116 to indicate that the memory sector is ready for another transaction. In one or more embodiments, during the transfer operation, the state of status register 150 may be monitored by the memory controller through the execution of the READSRG instruction to determine when the transfer operation is finished.

In one or more embodiments, a recall operation, when carried out in a hybrid memory 930 sector, may copy data from a non-volatile portion of hybrid memory 930 sector to the volatile portion therein. In one or more embodiments, the operation may be similar to the transfer operation discussed above, except that the data direction is reversed. In one or more embodiments, a recall operation may begin with the reception of an operation code (e.g., 1 byte) associated therewith, followed by address bytes (e.g., 3 bytes), from the memory controller through SI 172 line. In one or more embodiments, unlike a read or write transaction that involves data transfer, a recall transaction may require only the operation code associated therewith and address bytes. Again, the timing discussion associated with the recall operation is analogous to the discussion associated with FIG. 7. Therefore, the discussion associated therewith may be skipped for the sake of convenience.

In one or more embodiments, when the recall operation is to be performed on a hybrid memory 930 sector, only the sector address may be relevant. Referring to FIG. 8, the sector address may be matched with the address field of address map registers 820-827. If one of NVM0-NVM3 882 and one of VM0-VM3 892 are driven high (or low, depending on the implementation) as a result of the address match, then both NVMAC 883 signal and VMAC 893 signal may be driven high (or low, depending on the implementation) to indicate a recall operation in hybrid memory 930. Again, the user of the computing system associated with configurable memory device 100 may need to make sure that no more than one volatile memory sector 220 and one non-volatile memory sector 210 have the same sector address. Else, in one or more embodiments, the recall operation may result in wrong data getting copied to volatile memory sector 220.

Figure 12:
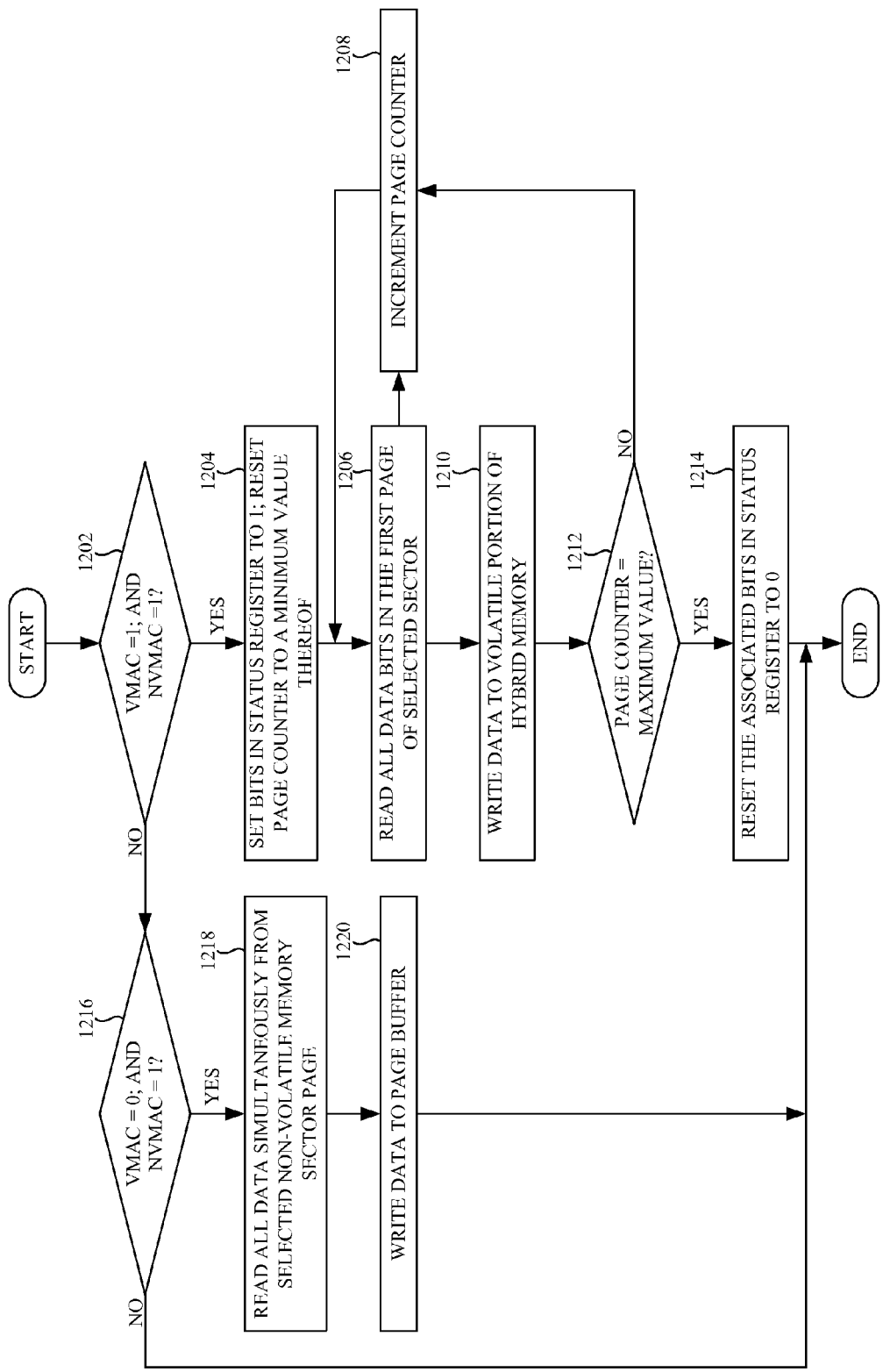
FIG. 12 is a flowchart detailing the operations involved in a recall transaction, according to one or more embodiments.

FIG. 12 shows a flowchart detailing the operations involved in a recall transaction, according to one or more embodiments. In one or more embodiments, if any memory sector is busy, i.e., if all bits in status register 150 are not 0 (or 1, depending on the implementation), the recall operation may be aborted. In one or more embodiments, operation 1202 may involve checking as to whether VMAC 893 signal and NVMAC 883 signal both are 1 (or 0, depending on the implementation). If yes, in operation 1204, the bits in status register 150 associated with the selected non-volatile memory sector 210 and volatile memory sector 220 may be set to 1 (or 0, depending on the implementation) to indicate that the memory sector is busy. Also, in operation 1204, page counter 160 may be reset to an initial value thereof (e.g., 00H in hexadecimal) to set up a first page (e.g. page 0) of the selected memory sectors for the data copy operation.

In operation 1206, all the data bits in the first page of selected non-volatile memory sector 210 (i.e., from the non-volatile portion of hybrid memory 930) may be read. In operation 1208, page counter 160 may then be incremented. Then, in operation 1210, data may be written to a volatile portion (e.g., a volatile memory sector 220) of hybrid memory 930. Now, the next memory page (e.g., page 1) of the selected volatile memory sector 220 and non-volatile memory sector 210 may be setup for the data copy operation. In one or more embodiments, the process may be repeated sequentially in the order of memory pages. In one or more embodiments, operation 1212 may involve checking as to whether page counter 160 has reached a maximum value thereof (e.g., 7FH in hexadecimal). In one or more embodiments, if yes, operation 1214 may involve resetting the associated bits in status register 150 to indicate that the memory sectors are ready for another transaction. The recall operation may, thus, be terminated. In one or more embodiments, if the result of operation 1212 indicates that page counter 160 has not reached the maximum value thereof, control may be passed to operation 1208 to increment page counter 160. Then the data copy operation may be performed on the next memory page.

Again, during the recall operation, the state of status register 150 may be monitored by the memory controller by executing the READSRG instruction. In one or more embodiments, the recall operation may also be performed on a non-volatile memory sector 210 alone. In one or more embodiments, in this case, data from a memory page of a non-volatile memory sector 210 may be copied to page buffer 140 associated therewith. The bits associated with sector address and page address may used to fetch data from non-volatile memory 110. Referring to FIG. 8, the sector address may be matched with the address field of address map registers 820-827. If the result of operation 1202 indicates that not both of VMAC 893 signal and NVMAC 883 signal are 1 (or 0, depending on the implementation), operation 1216 may involve checking as to whether one of NVM0-NVM3 882 is driven high (or low, depending on the implementation) and all VM0-VM3 892 stay low (or high, depending on the implementation) as a result of the address matching. In other words, operation 1216 may involve checking as to whether VMAC 893 signal is 0 (or 1, depending on the implementation) and NVMAC 883 signal is 1 (or 0, depending on the implementation).

If no, again, the recall operation may be terminated. If the result of operation 1216 indicates that VMAC 893 signal is 0 (or 1, depending on the implementation) and NVMAC 883 signal is 1 (or 0, depending on the implementation), the recall operation may be performed in non-volatile memory sector 210. The logical address thereof may match the state at AI 138. In one or more embodiments, in the selected non-volatile memory sector 210, the page address on AI 138 may be decoded to select the memory page for the data copy operation. In one or more embodiments, all data (e.g., 256 bytes) may be read simultaneously from the selected non-volatile memory sector 210 page in operation 1218 and written to page buffer 140 in operation 1220.

In one or more embodiments, the timing associated with a read register transaction may be similar to that of a read memory transaction shown in FIG. 5. The memory controller may initiate the read register transaction by transmitting the operation code (e.g., 1 byte) associated therewith and address bytes (e.g., 3 bytes) through SI 172 line. In configurable memory device 100, after the aforementioned operation code is decoded to be a register operation, the most significant byte of the address AI 138 may be decoded to select the register to be accessed. Status register 150 may be a read-only register. After the operation code and address bytes are received, configurable memory device 100 may transmit the register data (e.g., 8 bits) on SO 174 line. The subsequent clock prior to CE#404 being de-asserted high (or low, depending on the implementation) may result in the register data getting transmitted again.

Reading page erase register (not shown) may be similar to the above-mentioned operation, except for the read data including a different number of bits. Page erase register may be configured to store data indicating the erase state of a memory page. The read data may be transmitted repeatedly until the transaction is terminated with CE#404 being de-asserted. Reading address map registers 820-827 in address translation logic 800 (135) may result in the contents of all registers therein (e.g., 820-827) being read. In one example embodiment, the read data may include 8 bytes. Contents of address map registers 820-827 may be transmitted in an ascending order, i.e., from the first to the eighth byte, with the most significant bit being transferred first. Address map registers 824-827 may include only 4 bits and address map registers 820-823 may include 5 bits (e.g., 4 logical address bits and 1 WP 852 bit) in the aforementioned example embodiment. The aforementioned register bits may occupy a bit-field associated with "lower" bits and the rest of the most significant bits may be made up of 0s. For example, if address map register 825 includes AH (hexadecimal), then the third byte of the read data has a value of 0AH. The read data may be repeatedly transmitted until CE#404 is de-asserted high (or low, depending on the implementation).

In one or more embodiments, the timing associated with a write register transaction may similar to that of a write memory transaction shown in FIG. 6. The memory controller may initiate the write register transaction by transmitting the operation code (e.g., 1 byte) associated therewith and address bytes (e.g., 3 bytes) through SI 172 line. In configurable memory device 100, after the operation code is decoded to be a register write operation, the most significant byte of the address AI 138 may be decoded to select the register to be accessed. Data received after the address bytes may be the write data. In one or more embodiments, writing to the page erase register may be accomplished by writing the first N (e.g., N=16) bytes of the write data to the page erase register, with the first write data bit being written to the bit-field associated with the most significant bit of the register. If the write data exceeds N bytes, the rest of the write data bits may be ignored. The write transaction may be terminated with CE#404 being de-asserted high.

A WRITETA transaction may begin with the transmission of the operation code associated therewith, followed by write data bytes (e.g., 8 bytes). For example, the first byte of data may be written to address map register 827, with the first 4 bits being discarded and the last 4 bits being written thereto. The last bit may be written to the bit-field associated with the least significant bit. Similarly, the $2^{nd}$ to $4^{th}$ byte may be written to address map registers 824-826. The $5^{th}$ to $8^{th}$ byte may be written to address map registers 820-823, with first 3 bits of each byte being discarded and the last 5 bits being written such that the last bit is written to the bit-field associated with the least significant bit of the register. In one or more embodiments, as address map registers 820-827 may be composed of non-volatile memory cells, the writing operation thereto may include the erase the operation and the program operation.

The write operation may begin with setting all bits of status register 150 to 1 (or 0, depending on the implementation), thereby indicating that configurable memory device 100 is busy and may not accept any subsequent transaction. Then an erase operation may be carried out on associated registers (e.g., address map registers 824-826). While the erase operation is being carried out, the write data may be buffered in a temporary storage in read/write logic 830 of address translation logic 800 (135). After the erase operation, a program operation may be carried out simultaneously on the associated address map registers 824-826 to copy the write data in the temporary storage thereto. After the program operation, status register 150 bits may be reset to 0 (or 1, depending on the implementation) to indicate that configurable memory device 100 is ready for another transaction.

Figure 13:
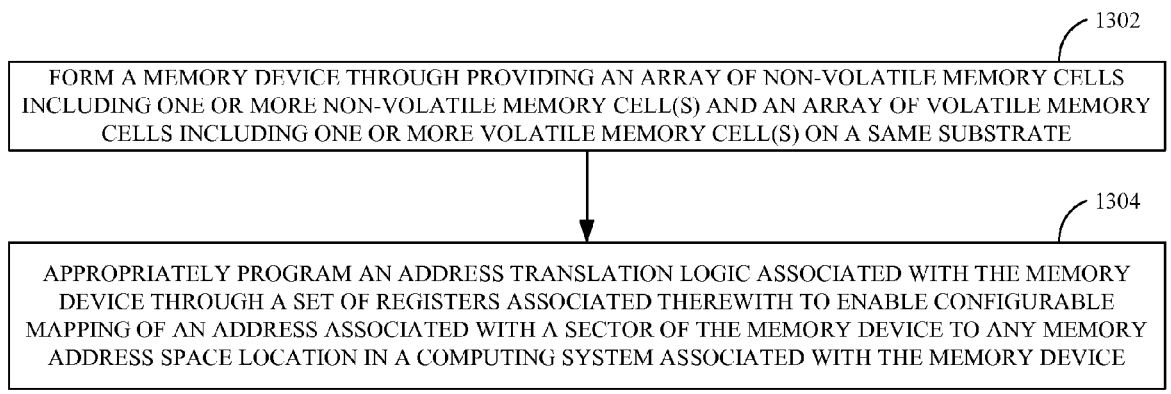
FIG. 13 is a process flow diagram detailing the operations involved in enabling configurable mapping of an address space location associated with the configurable memory device of FIG. 1 to any memory address space location in a computing system associated therewith, according to one or more embodiments.

FIG. 13 shows a process flow diagram detailing the operations involved in enabling configurable mapping of an address space location associated with configurable memory device 100 to any memory address space location in a computing system associated therewith, according to one or more embodiments. In one or more embodiments, operation 1302 may involve forming configurable memory device 100 through providing an array of non-volatile memory cells including one or more non-volatile memory cell(s) and an array of volatile memory cells including one or more volatile memory cells(s) on a substrate. In one or more embodiments, operation 1304 may involve appropriately programming address translation logic 800 (135) associated with configurable memory device 100 through a set of registers associated with a sector of configurable memory device 100 to any address space location in a computing system associated with configurable memory device 100. In one or more embodiments, address translation logic 800 (135) may be configured to enable translation of an external virtual address associated with the sector of configurable memory device 100 to a physical address associated therewith.

Figure 14:
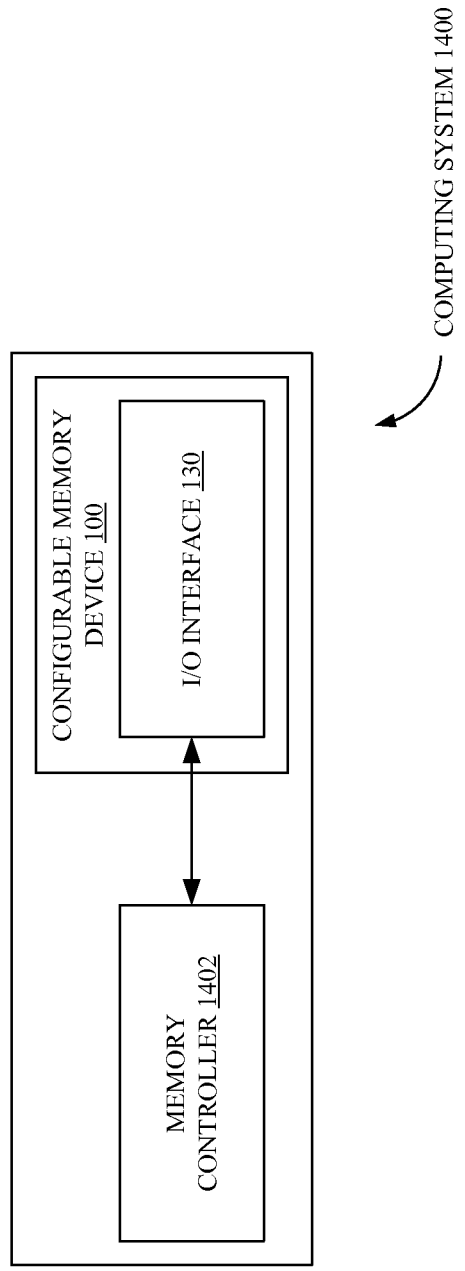
FIG. 14 is a schematic view of a computing system including the configurable memory device of FIG. 1, according to one or more embodiments.

FIG. 14 shows a computing system 1400 including configurable memory device 100, according to one or more embodiments. In one or more embodiments, computing system 1400 may include a memory controller 1402 configured to control data access to configurable memory device 100. In one or more embodiments, memory controller 1402 may be coupled to configurable memory device 100 through I/O interface 130 of configurable memory device 100.

It is obvious that the various numerals mentioned above serve merely as examples, and do not serve to limit the scope of the exemplary embodiments. Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). Accordingly, the specification and drawings are to be regarded in an illustrative rather than a restrictive sense.

What is claimed is:

1. A configurable memory device comprising:
a substrate;
an array of non-volatile memory cells including at least one non-volatile memory cell on the substrate;
an array of volatile memory cells including at least one volatile memory cell on the substrate;
an interface configured to enable coupling of the memory device to a memory controller associated therewith, the interface comprising an address translation logic configured to be programmed through a set of registers associated therewith to enable configurable mapping of different sectors of the memory device to different memory address space locations in a computing system associated with the memory device;
a tag register associated with the array of volatile memory cells to track a data update associated therewith; and
a hybrid memory on the substrate formed through programming a portion of the array of non-volatile memory cells to have a same address as a portion of the array of volatile memory cells,
wherein the hybrid memory is configured to be non-volatile and to enable random access of data therein.

2. The configurable memory device of claim 1,
wherein the array of non-volatile memory cells is an array of one of Read-Only Memory (ROM) cells and Flash memory cells, and
wherein the array of volatile memory cells is an array of Random Access Memory (RAM) cells.

3. The configurable memory device of claim 1, wherein the memory controller is configured to enable access to at least one of the array of non-volatile memory cells, the array of volatile memory cells and the hybrid memory.

4. The configurable memory device of claim 3, wherein the memory controller is configured to enable at least one of:
a memory read operation from one of the array of non-volatile memory cells, the array of volatile memory cells and the hybrid memory;
an erase operation on one of the array of non-volatile memory cells and a non-volatile portion of the hybrid memory;
a memory write operation to the one of the array of non-volatile memory cells, the array of volatile memory cells and the hybrid memory;
a transfer operation signifying copying data from a volatile portion of the hybrid memory to a non-volatile portion therein;
a recall operation signifying one of copying data from the non-volatile portion of the hybrid memory to the volatile portion therein and copying data from a portion of the array of non-volatile memory cells not including any portion of the hybrid memory to another portion therein through a buffer associated therewith;
a register read operation through the memory device to allow reading of registers associated with the memory device, the registers including at least the set of registers associated with the address translation logic; and
a register write operation through the memory device to allow writing to the registers associated with the memory device
through transmission of an operation code associated with an appropriate type of access of the memory device thereto, the appropriate type of access indicating the corresponding one of the memory read operation, the erase operation, the memory write operation, the transfer operation, the recall operation, the register read operation, and the register write operation.

5. The configurable memory device of claim 4,
wherein the memory controller is configured to drive an enable signal to an appropriate level to initiate transmission of the operation code, and
wherein one of a rising edge and a falling edge of a clock associated with the interface configured to enable coupling of the memory device to the memory controller is utilized to time the corresponding one of the memory read operation, the erase operation, the memory write operation, the transfer operation, the recall operation, the register read operation and the register write operation.

6. The configurable memory device of claim 5, wherein the erase operation includes one of an erase memory operation configured to erase all content associated with the one of the array of non-volatile memory cells and the non-volatile portion of the hybrid memory, an erase sector operation configured to erase all content associated with a sector of the one of the array of non-volatile memory cells and the non-volatile portion of the hybrid memory, and an erase page operation configured to erase all content associated with a page of the sector of the one of the array of non-volatile memory cells and the non-volatile portion of the hybrid memory.

7. The configurable memory device of claim 5, wherein the address translation logic comprises:
an address map register configured to store an address associated with a corresponding sector of the one of the array of non-volatile memory cells, the array of volatile memory cells and the hybrid memory; and
a comparator, associated with the address map register and configured to compare a memory access address associated with the corresponding one of the memory read operation, the erase operation, the memory write operation, the transfer operation and the recall operation with the address stored in the address map register to enable an appropriate memory access associated therewith.

8. The configurable memory device of claim 7,
wherein the transfer operation between the volatile portion of the hybrid memory and the non-volatile portion therein is performed sequentially,
wherein the sequential transfer operation signifies performing the transfer operation one modified memory page at a time,
wherein the modified memory page signifies a page associated with a corresponding sector of the hybrid memory including data that has been modified following a previous transfer operation associated therewith,
wherein the tag register includes a tag bit associated with the modified memory page, and
wherein the tag bit associated with the modified memory page indicates the modified status thereof.

9. The configurable memory device of claim 7, wherein the recall operation between the one of the non-volatile portion of the hybrid memory and the volatile portion therein and the portion of the array of non-volatile memory cells not including any portion of the hybrid memory and the another portion therein is sequentially performed one memory page at a time.

10. A computing system comprising:
a memory device comprising:
a substrate;
an array of non-volatile memory cells including at least one non-volatile memory cell on the substrate;
an array of volatile memory cells including at least one volatile memory cell on the substrate; and
an interface comprising an address translation logic configured to be programmed through a set of registers associated therewith to enable configurable mapping of different sectors of the memory device to different memory address space locations in the computing system; and
a memory controller, associated with the memory device and coupled to the memory device through the interface,
wherein the memory device further comprises a hybrid memory on the substrate formed through programming a portion of the array of non-volatile memory cells to have a same address as a portion of the array of volatile memory cells,
wherein the hybrid memory is configured to be non-volatile and to enable random access of data therein,
wherein the memory device further comprises a hybrid memory on the substrate formed through programming a portion of the array of non-volatile memory cells to have a same address as a portion of the array of volatile memory cells,
wherein the hybrid memory is configured to be non-volatile and to enable random access of data therein.

11. The computing system of claim 10,
wherein the array of non-volatile memory cells is an array of one of Read-Only Memory (ROM) cells and Flash memory cells, and
wherein the array of volatile memory cells is an array of Random Access Memory (RAM) cells.

12. The computing system of claim 10, wherein the memory device is a System-on-a-Chip (SoC).

13. The computing system of claim 10, wherein the interface of the memory device configured to enable coupling of the memory controller therewith utilizes one of a serial bus and a parallel bus therefor.

14. The computing system of claim 10, wherein the memory controller is configured to enable at least one of:
a memory read operation from one of the array of non-volatile memory cells, the array of volatile memory cells and the hybrid memory;
an erase operation on one of the array of non-volatile memory cells and a non-volatile portion of the hybrid memory;
a memory write operation to the one of the array of non-volatile memory cells, the array of volatile memory cells and the hybrid memory;
a transfer operation signifying copying data from a volatile portion of the hybrid memory to a non-volatile portion therein;
a recall operation signifying one of copying data from the non-volatile portion of the hybrid memory to the volatile portion therein and copying data from a portion of the array of non-volatile memory cells not including any portion of the hybrid memory to another portion therein through a buffer associated therewith;
a register read operation through the memory device to allow reading of registers associated with the memory device, the registers including at least the set of registers associated with the address translation logic; and
a register write operation through the memory device to allow writing to the registers associated with the memory device through transmission of an operation code associated with an appropriate type of access of the memory device thereto, the appropriate type of access indicating the corresponding one of the memory read operation, the erase operation, the memory write operation, the transfer operation, the recall operation, the register read operation, and the register write operation.

15. A method comprising:
forming a memory device through providing an array of non-volatile memory cells including at least one non-volatile memory cell and an array of volatile memory cells including at least one volatile memory cell on a substrate;
appropriately programming an address translation logic associated with the memory device through a set of registers associated therewith to enable configurable mapping of different sectors of the memory device to different memory address space locations in a computing system associated with the memory device;
tracking a data update associated with the array of volatile memory cells through a tag register associated therewith; and
forming a hybrid memory on the substrate through programming a portion of the array of non-volatile memory cells to have a same address as a portion of the array of volatile memory cells, the hybrid memory being configured to be non-volatile and to enable random access of data therein,
wherein the address translation logic is configured to enable translation of an external virtual address associated with a sector of the memory device to a physical address associated therewith.

16. The method of claim 15, comprising providing an array of one of Read-Only Memory (ROM) cells and Flash memory cells as the array of non-volatile memory cells, and an array of Random Access Memory (RAM) cells as the array of volatile memory cells.

17. The method of claim 15, further comprising enabling access to at least one of the array of non-volatile memory cells, the array of volatile memory cells and the hybrid memory through a memory controller associated with the memory device.

18. The method of claim 17, wherein enabling access to the at least one of the array of non-volatile memory cells, the array of volatile memory cells and the hybrid memory through the memory controller includes at least one of:
  enabling a memory read operation from one of the array of non-volatile memory cells, the array of volatile memory cells and the hybrid memory;
  enabling an erase operation on one of the array of non-volatile memory cells and a non-volatile portion of the hybrid memory;
  enabling a memory write operation to the one of the array of non-volatile memory cells, the array of volatile memory cells and the hybrid memory;
  enabling a transfer operation signifying copying data from a volatile portion of the hybrid memory to a non-volatile portion therein;
  enabling a recall operation signifying one of copying data from the non-volatile portion of the hybrid memory to the volatile portion therein and copying data from a portion of the array of non-volatile memory cells not including any portion of the hybrid memory to another portion therein through a buffer associated therewith;
  enabling a register read operation through the memory device to allow reading of registers associated with the memory device, the registers including at least the set of registers associated with the address translation logic; and
  enabling a register write operation through the memory device to allow writing to the registers associated with the memory device
through transmission of an operation code associated with an appropriate type of access of the memory device from the memory controller to the memory device, the appropriate type of access indicating the corresponding one of the memory read operation, the erase operation, the memory write operation, the transfer operation, the recall operation, the register read operation, and the register write operation.

19. The method of claim 18, further comprising:
  driving an enable signal to an appropriate level through the memory controller to initiate the transmission of the operation code; and
  timing the corresponding one of the memory read operation, the erase operation, the memory write operation, the transfer operation, the recall operation, the register read operation, and the register write operation based on one of a rising edge and a falling edge of a clock associated with an interface configured to couple the memory device to the memory controller.

20. The method of claim 19, wherein the erase operation includes one of an erase memory operation configured to erase all content associated with the one of the array of non-volatile memory cells and the non-volatile portion of the hybrid memory, an erase sector operation configured to erase all content associated with a sector of the one of the array of non-volatile memory cells and the non-volatile portion of the hybrid memory, and an erase page operation configured to erase all content associated with a page of the sector of the one of the array of non-volatile memory cells and the non-volatile portion of the hybrid memory.

21. The method of claim 19, wherein at least one of the memory read operation, the erase operation, the memory write operation, the transfer operation and the recall operation includes:
  comparing a memory access address associated therewith an address associated with a corresponding sector of the one of the array of non-volatile memory cells, the array of volatile memory cells and the hybrid memory stored in an address map register associated with the address translation logic through a comparator associated with the address map register; and
  enabling an appropriate memory access to the corresponding one of the array of non-volatile memory cells, the array of volatile memory cells and the hybrid memory based on the comparison through the comparator associated with the address map register.

22. The method of claim 21, further comprising sequentially performing the transfer operation between the volatile portion of the hybrid memory and the non-volatile portion therein one modified memory page at a time,
  wherein the modified memory page signifies a page associated with a corresponding sector of the hybrid memory including data that has been modified following a previous transfer operation associated therewith,
  wherein a tag bit associated with the modified memory page indicates the modified status thereof, and
  wherein the tag register includes the tag bit associated with the modified memory page.

23. The method of claim 21, further comprising sequentially performing the recall operation between the one of the non-volatile portion of the hybrid memory and the volatile portion therein and the portion of the array of non-volatile memory cells not including any portion of the hybrid memory and the another portion therein one memory page at a time.

* * * * *